United States Patent [19]
Ohishi

[11] Patent Number: 5,772,513
[45] Date of Patent: Jun. 30, 1998

[54] APPARATUS FOR SIMULATIVELY ROTATING A PLAYING BOX OF A SIMULATION GAME MACHINE

[75] Inventor: Toshimitsu Ohishi, Kobe, Japan

[73] Assignee: Konami Co., Ltd., Hyogo-ken, Japan

[21] Appl. No.: 514,637

[22] Filed: Aug. 14, 1995

[30] Foreign Application Priority Data

Aug. 17, 1994 [JP] Japan ................................ 6-193223

[51] Int. Cl.[6] .............................. G09B 9/00; A63G 31/16
[52] U.S. Cl. ............................. 463/46; 472/130; 472/60; 472/59; 434/55
[58] Field of Search .................................. 463/1–2, 5, 7, 463/36, 46; 472/1, 29–30, 35, 40, 47, 55, 59–61, 130; 434/29, 55, 59, 61–62, 365, 307 R; 364/410

[56] References Cited

U.S. PATENT DOCUMENTS

| | | | |
|---|---|---|---|
| 2,514,762 | 7/1950 | Hayes et al. | 434/55 |
| 2,524,238 | 10/1950 | Soulé. | |
| 2,602,243 | 7/1952 | Link | 434/55 |
| 3,494,052 | 2/1970 | Corlyon | 434/55 |
| 5,226,831 | 7/1993 | Horiuchi. | |
| 5,366,375 | 11/1994 | Sarnicola | 434/29 |
| 5,490,784 | 2/1996 | Carmein | 434/29 |
| 5,551,920 | 9/1996 | Ogden et al. | 434/55 |

FOREIGN PATENT DOCUMENTS

| | | |
|---|---|---|
| 1154249 | 4/1958 | France. |
| 6210066 | 8/1994 | Japan. |

OTHER PUBLICATIONS

Patent Abstracts of Japan vol. 018 No. 571 (C1267), 2 Nov. 1994 & JP-A-06 210066 (Konami KK) 2 Aug. 1994—abstract.

Patent Abstracts of Japan vol. 011 No. 045 (P-546), 10 Feb. 1987 & JP-A-61 213806 (Kaiyo Kagaku Gijutsu Center; Others: 01) 22 Sep. 1986—abstract.

*Primary Examiner*—Jessica Harrison
*Assistant Examiner*—Mark A. Sager
*Attorney, Agent, or Firm*—Jordan and Hamburg

[57] ABSTRACT

A rotating apparatus for simulatively rotating a playing box of a simulation game machine includes: a turn table on which the playing box is mounted, the playing box being provided with a controlling portion having a first signal transmission wire; a driver which rotates the turn table, the driver being provided with a controller having a second signal transmission wire; and a rotary connector provided in a center of the turn table. The rotary connector includes: a first conductive member rotatable with the turn table, and electrically connected with the first signal transmission wire; and a second conductive member being stationary in relative to and electrically connected with the first conductive member, and electrically connected with the second signal transmission wire.

8 Claims, 11 Drawing Sheets

APPARATUS FOR SIMULATIVELY ROTATING A PLAYING BOX OF A SIMULATION GAME MACHINE

BACKGROUND OF THE INVENTION

This invention relates to an apparatus for simulatively rotating a playing box of a simulation game machine.

In conventional simulation game machines in which a player plays a simulation game on a screen provided in a playing box, there is provided an arrangement for giving a realistic feeling to the player by rotating the playing box in response to his or her operations. The arrangement includes a rotating apparatus having a turn table on which a playing box is mounted and is controlledly rotated in accordance with a simulative image displayed on the screen.

In the playing box rotating apparatus having a turn table, there has been a significant problem which must be solved. The problem is how to transmit a control signal between a rotary portion and a stationary portion without twisting transmission wires.

Japanese Unexamined Patent Publication No. 6-210066 discloses an infrared signal transmission system. Specifically, a torque motor for rotating a turn table is provided on a base member of a simulation game machine. A signal transmission wire is accommodated in an axial hollow formed in a center shaft of the torque motor. A photoreceiver is provided on an outside of the center shaft and connected with the signal transmission wire accommodated in the hollow of the center shaft. On the other hand, the turn table is provided with a cylindrical skirt on an underside of the turn table. The cylindrical skirt rotates around the center shaft of the torque motor together with the turn table. The cylindrical skirt has a light reflective inner surface, and is provided with a phototransmitter connected with a signal transmission wire run from the playing box. The phototransmitter converts a command signal from the playing box from the electrical form into the optical form, and then sends the command signal in the form of infrared light. The infrared light reflects at the light reflective inner surface of the cylindrical skirt, then reaching the photoreceiver mounted on the center shaft. In this way, the command signal is transmitted from the playing box on the turn table, i.e., the rotary portion, to the controller provided on the base member, i.e., the stationary portion, without the likelihood of the transmission wires being twisted.

However, in the conventional apparatus in which a signal is transmitted in the optical form between the rotary portion and the stationary portion, the transmission error is highly liable to occur. Also, the formation of the light reflective surface requires high precision technique, which consequently increases the production costs.

SUMMARY OF THE INVENTION

It is an object of the present invention to provide a rotating apparatus for simulatively rotating a playing box of a simulation game machine which has overcome the aforementioned problems of the prior art.

It is another object of the present invention to provide a rotating apparatus for simulatively rotating a playing box of a simulation game machine which will assure signal transmission between a rotary portion and a stationary portion without twisting signal transmission wires when the rotary portion is rotated.

According to the present invention, a rotating apparatus for simulatively rotating a playing box of a simulation game machine, comprises: a turn table on which the playing box is mounted, the playing box being provided with a controlling portion having a first signal transmission wire; a driver which rotates the turn table, the driver being provided with a controller having a second signal transmission wire; and a rotary connector provided in a center of the turn table, the rotary connector including: a first conductive member rotatable with the turn table, and electrically connected with the first signal transmission wire; and a second conductive member being stationary in relative to and electrically connected with the first conductive member, and electrically connected with the second signal transmission wire.

The first conductive member may be in the form of a hollow cylinder while the second conductive member may be in the form of a hollow cylinder having an outside surface diameter thereof substantially the same as an inside surface diameter of the first conductive member so that an outside surface of the second conductive member comes into contact with an inside surface of the first conductive member.

Further, there may be provided an elevating cylinder mounted on the turn table for elevating the playing box; and an actuating fluid supplier which supplies actuating fluid to the elevating cylinder, the actuating fluid supplier having a supply pipe extending through a center of the turn table. It may be appreciated to attach the first conductive member to the turn table and attach the second conductive member to a periphery of the supply pipe.

Furthermore, a brake cylinder may be mounted on the turn table to stop a rotation of the turn table.

With these rotating apparatus, the rotary connector, which includes the first conductive member rotatable with the turn table and the second conductive member being stationary in relative to the first conductive member, connects the first signal transmission wire carried by the turn table with the second signal transmission wire connected to the driver by the use of the first and second conductive members. Accordingly, signal transmission can be reliably carried out because of the direct connection between of the first and second conductive members. Also, there will be no likelihood that the signal transmission wire is twisted. Further, comparing to the conventional apparatus using the infrared transmission, this inventive apparatus will be simpler in construction.

Also, in the case that the first and second conductive members each have the form of hollow cylinder, electrical contact is made between the whole inner and outer periphery surfaces of the first and second conductive members. This will thus increase the reliability of the signal transmission.

In the construction in which the first conductive cylinder of the rotary connector is attached to the turn table and the second conductive cylinder is attached to a periphery of the supply pipe of the actuating fluid supplier, there will not be the need of providing a special device to support the rotary connector. Accordingly, a simplified construction can be attained.

The brake cylinder makes it possible to automatically stop the turn table without frightening a player even when a power failure or system breakdown occurs during the rotation of the turn table.

These and other objects, features and advantages of the invention will become more apparent upon a reading of the following detailed description of the preferred embodiment with reference to the appended drawings.

DETAILED DESCRIPTION OF THE PREFERRED EMBODIMENT OF THE INVENTION

Figure 1:
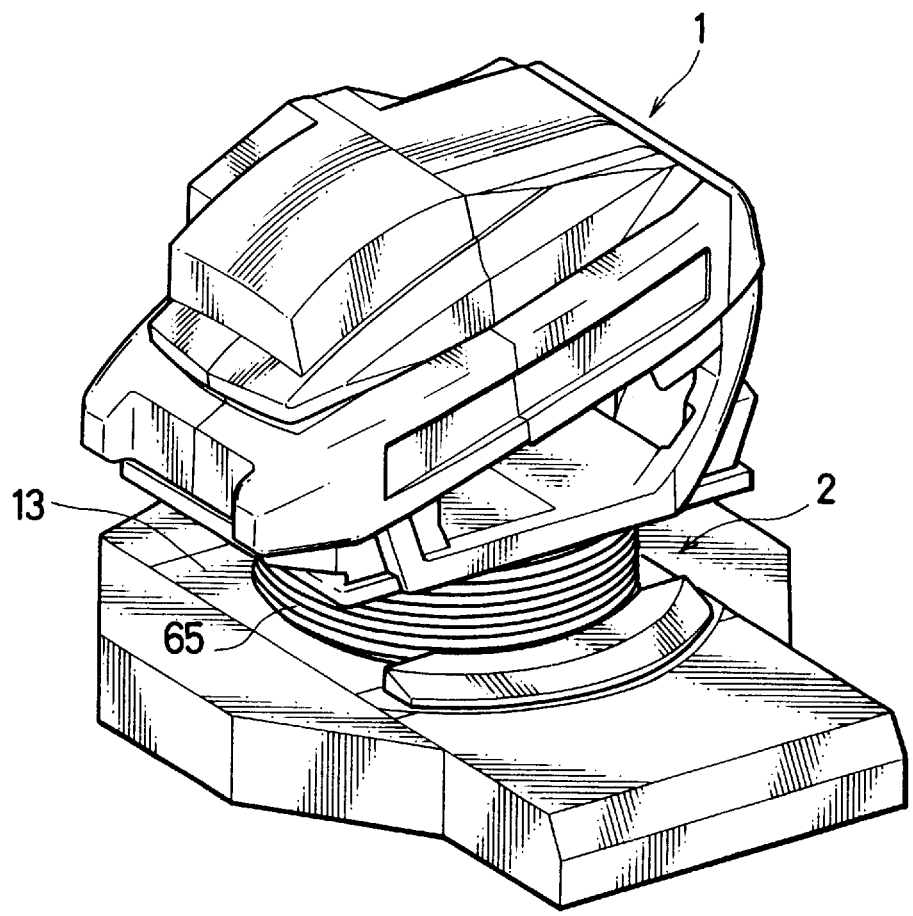
FIG. 1 is a perspective view showing an overall external appearance of a simulation game machine using a rotating apparatus of the present invention.
Figure 2:
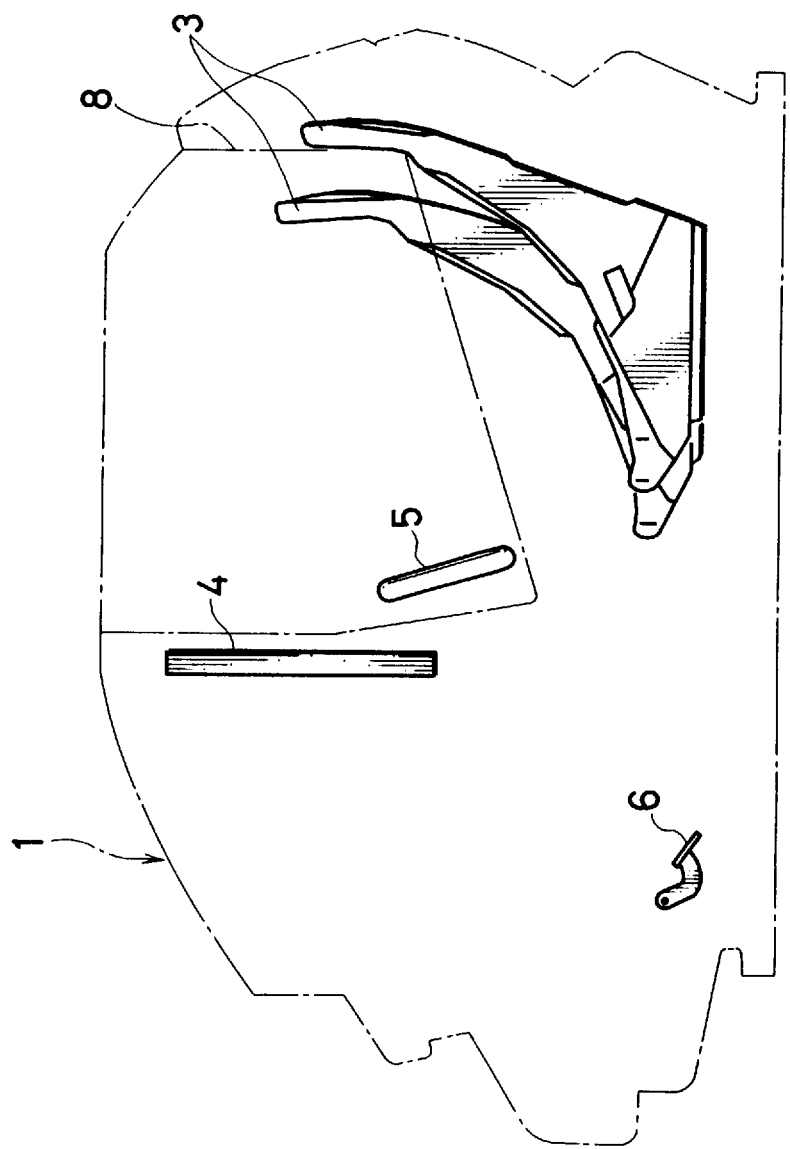
FIG. 2 is a schematic diagram showing a side of a playing box of the simulation game machine.
Figure 3:
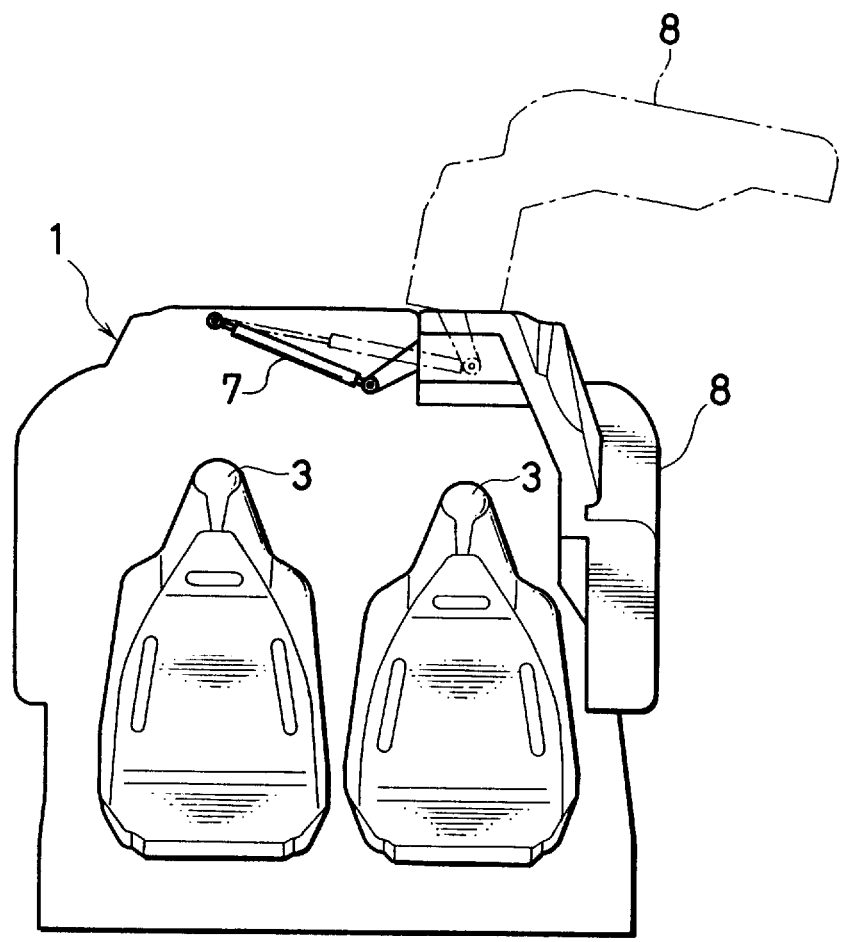
FIG. 3 is a schematic diagram showing a front of the playing box.

FIG. 1 shows a simulation game machine using a rotating apparatus of the present invention. The simulation game machine comprises a playing box 1 which can accommodate one or two players when playing a simulation game, and a drive section 2 for turning and moving up and down the playing box 1. The playing box 1 of the simulation game machine is, as shown in FIGS. 2 and 3, provided with a pair of seats 3 allowing two players to be seated side by side, a simulation game screen 4 employing a cathode ray tube (CRT), a liquid crystal display (LCD) or the like, a steering wheel 5 operated by the players, pedals 6 such as an accelerator pedal and a brake pedal, and gull-wing doors 8 to be swung upward by means of a cylinder 7.

Figure 4:
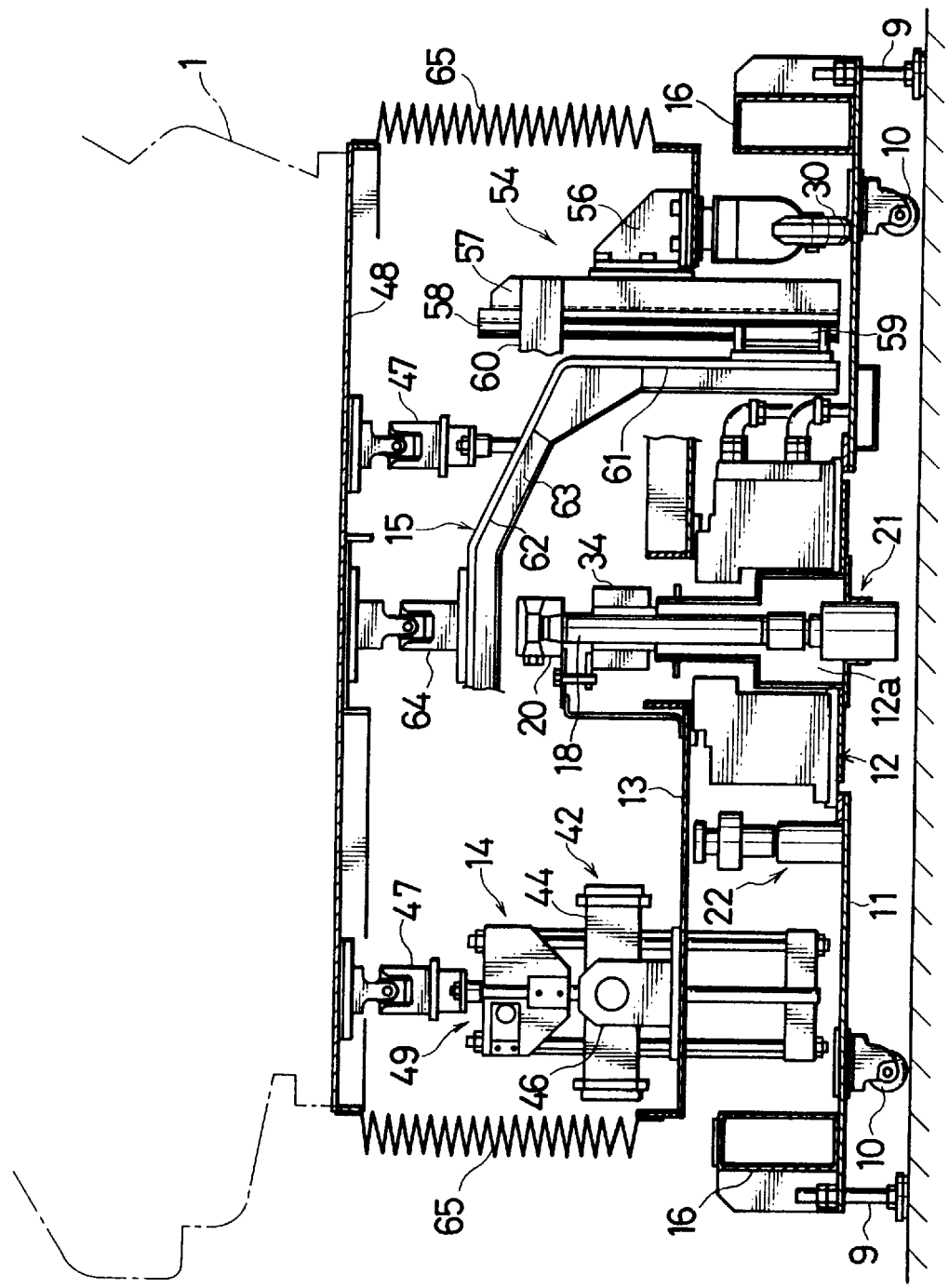
FIG. 4 is a sectional view showing a drive section of the simulation game machine.
Figure 5:
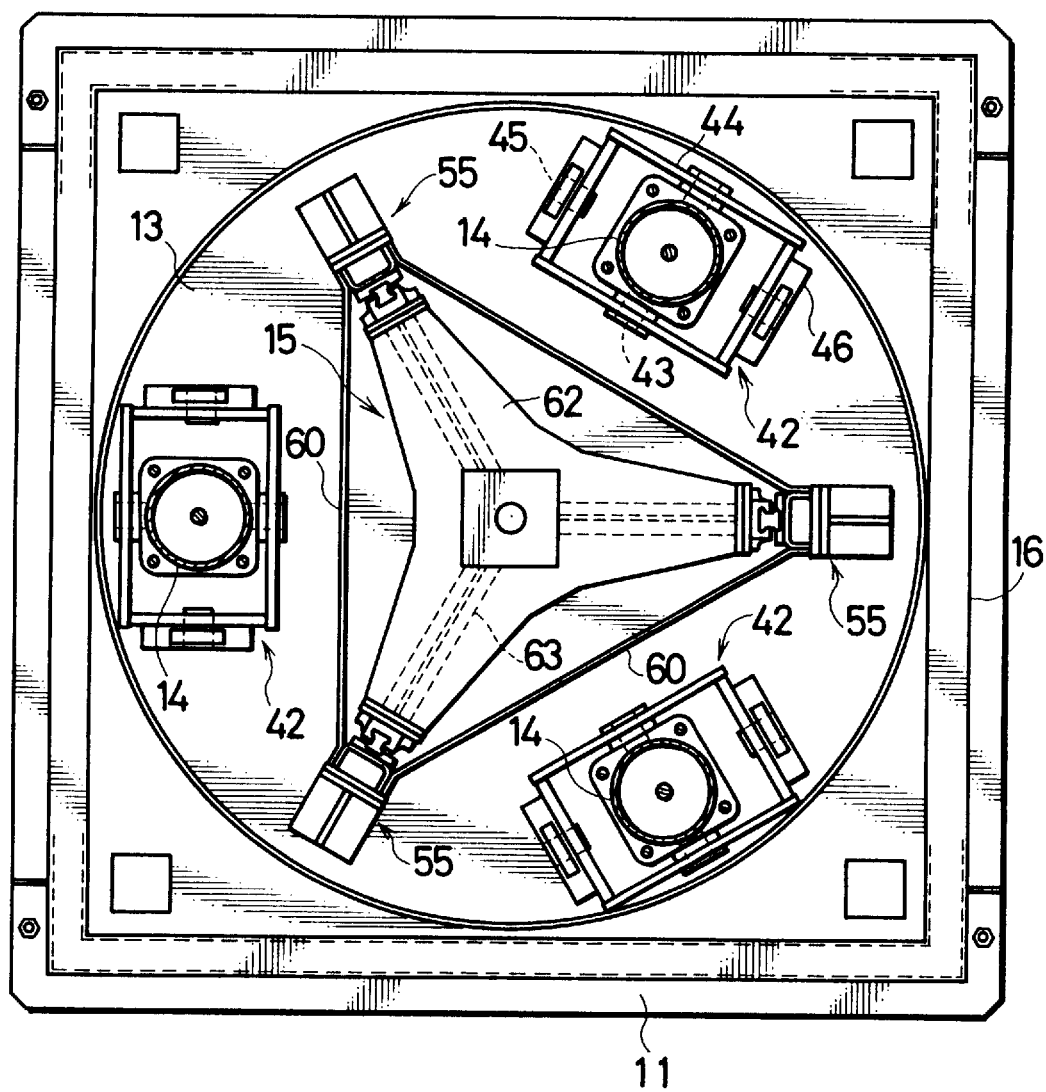
FIG. 5 is a plan view showing the drive section.

As shown in FIGS. 4 and 5, the drive section 2 includes a base plate 11 attached with adjusters 9 and casters 10, a torque motor 12 mounted at an approximate center of a top surface of the base plate 11, a circular turn table 13 which is rotated around by the torque motor 12, and three elevating cylinders 14 radially arranged on the turn table 13 around its center of rotation. A slidable supporting frame 15 is provided beneath the playing box 1 of the simulation game machine. A space between the bottom of the playing box 1 and the turn table 13 is surrounded by a bellows-like cover 65.

A square pipe 16 is attached on a periphery end of a top surface of the base plate 11 as a reinforcing member for reinforcing the base plate 11. The square pipe 16 has a closed space which is used as an air tank. Pressurized air is filled in the closed space of the reinforcing members 16 by an air compressor as disclosed hereinafter, and is then supplied to the cylinder 7, elevating cylinders 14.

Also, provided at a center of the base plate 11 is an air supply unit 21 comprising an air joint 17 connected to the air tank of the reinforcing members 16 via an unillustrated connecting pipe, an air pipe 18 extending upward through a space 12a formed in a center portion of the torque motor 12, and a swivel joint 20 attached at a center of the top surface of the turn table 13 via a retaining bracket 19.

Figure 6:
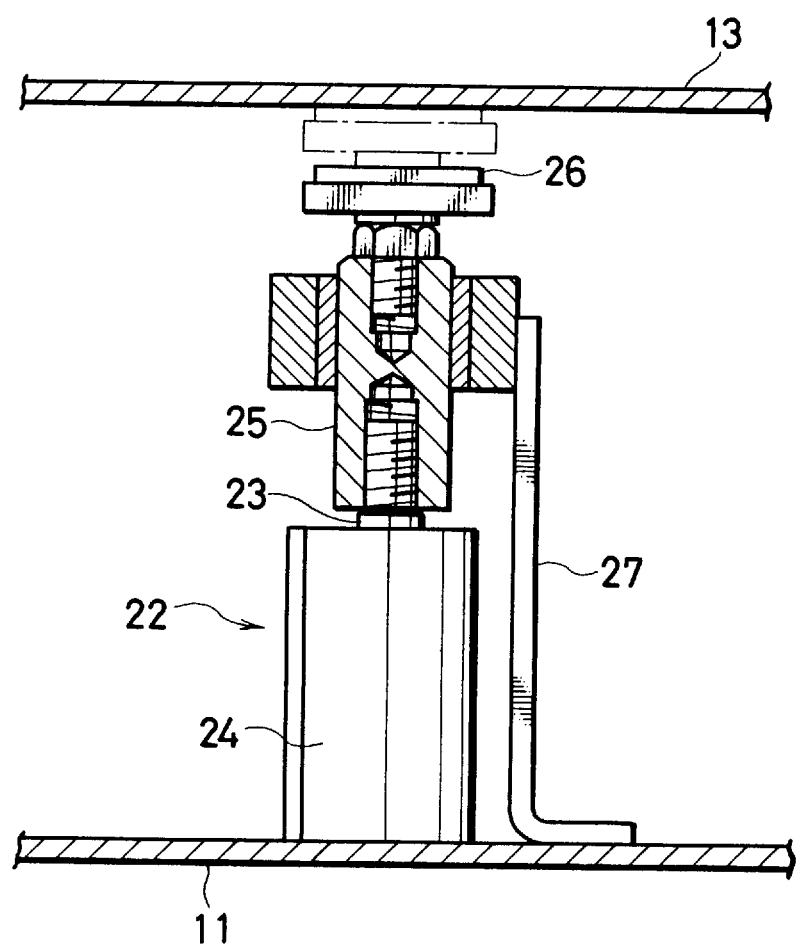
FIG. 6 is a sectional view showing a brake cylinder.

Furthermore, a brake cylinder 22 is mounted on the base plate 11 and outside the torque motor 12 to stop rotation of the turn table 13 whenever necessary. As shown in FIG. 6, the brake cylinder 22 includes a main cylinder body 24 for moving up and down a piston rod 23, a brake pad 26 attached to an upper end of the piston rod 23 by a connecting member 25. Also, a supporting bracket 27 is attached on the base plate 11 to slidably support the connecting member 25. In case of emergency such as a power failure or a breakdown of an electric system of the simulation game machine, compressed air is supplied into the main cylinder body 24 to push up the piston rod 23, causing the brake pad 26 to be tightly pressed against the bottom of the turn table 13.

Figure 7:
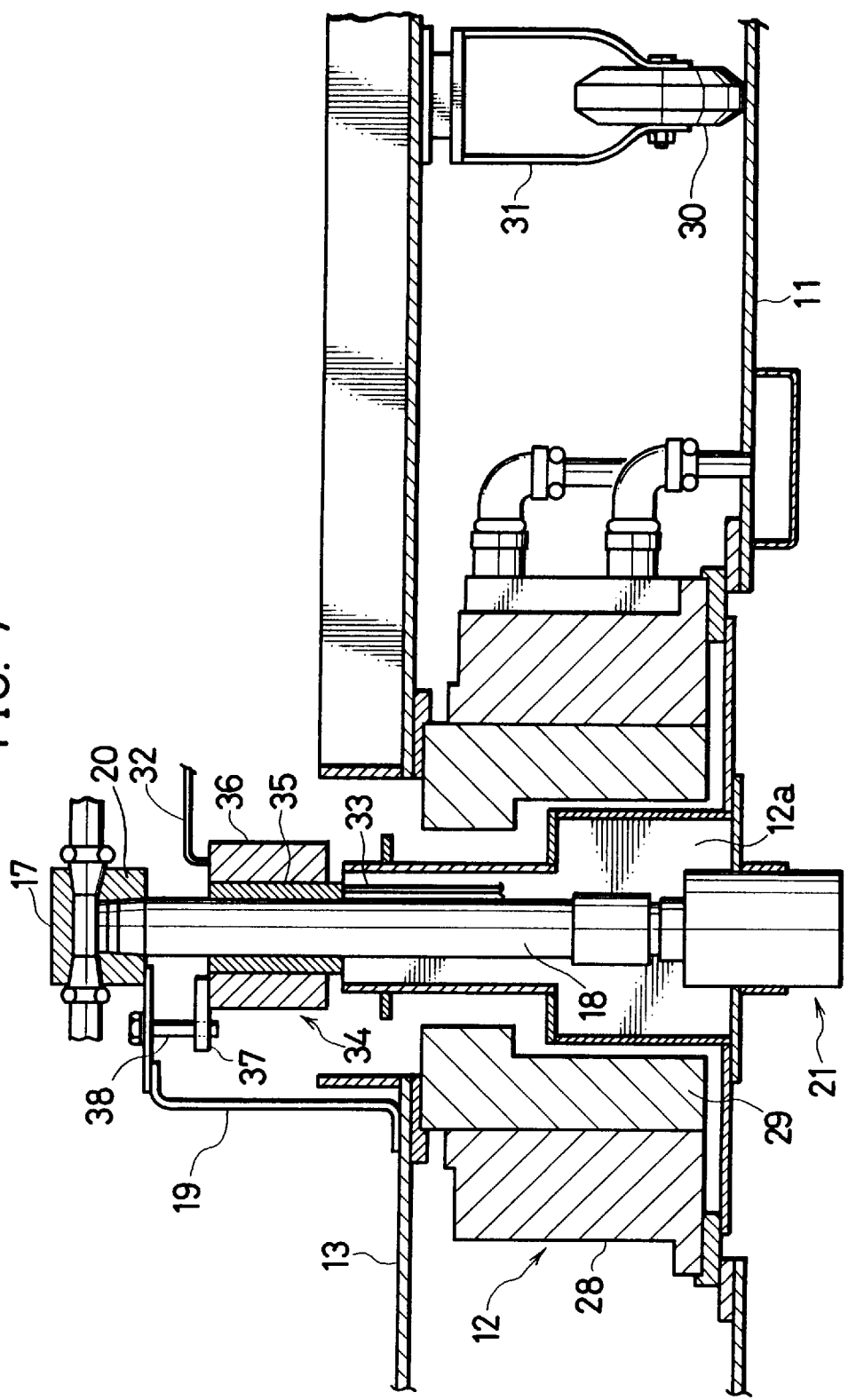
FIG. 7 is a sectional view showing a turn drive mechanism.

Referring to FIG. 7, the torque motor 12 includes a stator 28 mounted on the base plate 11 and a rotor 29 having a hollow cylindrical shape which is rotated by the stator 28. The turn table 13 is fixedly attached to the upper end of the rotor 29. A plurality of wheels 30 are attached on a periphery end of an underside of the turn table 13 by retainers 31. As the rotor 29 of the torque motor 12 rotates, the wheels 30 roll over the base plate 11, thereby rotating the turn table 13.

A rotary connector 34 is provided around the air pipe 18 of the air supply unit 21 for connecting between a bundle of upper signal transmission wires 32 connected with a controlling portion of the playing box 1 mounted on the turn table 13 and a bundle of lower signal transmission wires 33 connected with a controller provided on the base plate 11 of the game machine.

The rotary connector 34 includes an inner conductive cylinder member 35 firmly attached to the air pipe 18 and an outer conductive cylinder member 36 rotatably mounted over the inner conductive cylinder member 35. The inner and outer conductive cylinder members 35 and 36 are electrically connected with each other. The outer conductive cylinder member 36 is attached with a stopper plate 37. The stopper plate 37 is projected out from the outer conductive cylinder member 36, and held by a protruding bolt 38 fixedly attached to the retaining bracket 19 of the turn table 13. In this way, the outer conductive cylinder member 36 is rotated together with the turn table 13.

A terminal for the upper transmission wires 32 which are connected to the outer conductive cylinder member 36 is located on an inner surface of the outer conductive cylinder member 36 while a terminal for the lower transmission wires 33 which are passed through a gap between the air pipe 18 and the rotor 29 of the torque motor 12 and connected to the inner conductive cylinder member 35 is located on an outer surface of the inner conductive cylinder member 35. The two terminals are arranged in such a way that they are kept in mutual contact, the upper transmission wires 32 and lower transmission wires 33 are connected to each other. This arrangement makes it possible to exchange control signals between a controller mounted on the base plate 11, for instance, and control devices mounted on the playing box 1 without causing the transmission wires 32, 33 to twist even when the turn table 13 rotates.

Figure 8:
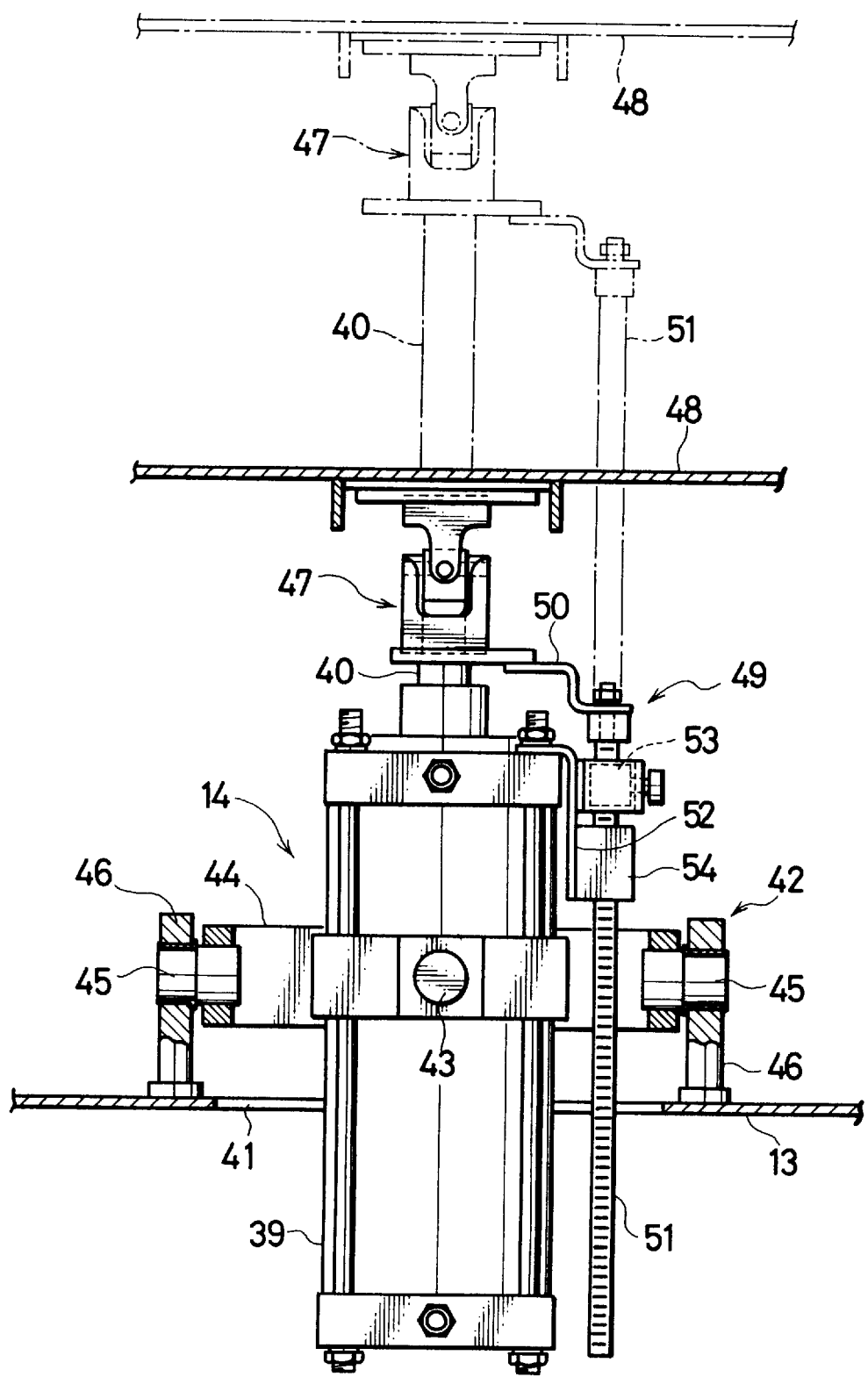
FIG. 8 is a sectional view showing an elevating cylinder.

Referring to FIG. 8, each elevating cylinder 14 includes a main cylinder body 39 having upper and lower air ports, and a piston rod 40 movable out and in the main cylinder body 39. The main cylinder body 39 is swingably supported at an upper position slightly away from a midpoint of its length by a support mechanism 42 mounted on a top surface of the turn table 13 with the lower portion of the main cylinder body 39 sticking out from under the turn table 13 through an opening 41 formed close the periphery.

Each support mechanism 42 includes a first support member 44 formed into a rectangular shape to support the relevant elevating cylinder 14 swingably about a first pair of pivots 43 projectingly mounted on both sides of the main cylinder body 39 along a line passing through the center of rotation of the turn table 13, and a second support member 46 having a pair of supporting brackets to support the first support member 44 swingably about a second pair of pivots 45 projectingly mounted at right angles to the axis of the first pair of pivots 43.

It will be seen that the individual elevating cylinders 14 are supported swingably at a desired angle about the first and second pairs of pivots 43 and 45 mounted at right angles to each other. Also, the piston rod 40 of each elevating cylinder 14 is connected to a bottom plate 48 of the playing box 1 via a universal joint 47 having a pair of mutually perpendicular pivots. Each elevating cylinder 14 is provided with a displacement gauge 49 for measuring the amount of projection of the piston rod 40.

Each displacement gauge 49 includes a rack bar 51 fixedly attached to the upper end of the piston rod 40 by a mounting bracket 50, a potentiometer 53 and a rack guide 54 fixedly attached to the top of the main cylinder body 39 by a mounting bracket 52. When the piston rod 40 is driven and the rack bar 51 is pulled upward, a pinion of the potentiometer 53 rotates. As a result, the potentiometer 53 outputs a signal indicating the amount of projection of the piston rod 40, or the amount of the upward movement of the bottom plate 48 of the playing box 1, to the unillustrated controller.

Referring again to FIGS. 4 and 5, three guiding stands 55 are provided between the elevating cylinders 14 on the turn table 13 to guide the vertical movement of the slidable supporting frame 15. Each guiding stand 55 includes a supporting bracket 56 fixedly attached to the top surface of the turn table 13 near the periphery of the turn table 13, a C-shaped vertical steel member 57 fixedly attached to the supporting bracket 56, a guide rail 58 mounted on the C-shaped vertical steel member 57, and a slide block 59 supported movably along the guide rail 58. The individual C-shaped vertical steel members 57 are tied up together at their upper ends by reinforcing plates 60.

The slidable supporting frame 15 has three legs 61 whose lowermost portions are individually fixedly attached to the slide blocks 59 of the guiding stands 55, upper plates 62 extending inward from the upper ends of the individual legs 61, and reinforcing ribs 63 attached to the underside of the respective upper plates 62. Between the bottom plate 48 of the playing box 1 and a center of a top surface of the slidable supporting frame 15 where the individual upper plates 62 meet, there is provided a universal joint 64 having a pair of mutually perpendicular pivots. This universal joint 64 connects between the center of the slidable supporting frame 15 and a center of the underside of the playing box 1 to allow the playing box 1 to rock or swing in desired directions. As the playing box 1 is pushed upward and pulled downward by the elevating cylinders 14, the slidable supporting frame 15 supports the playing box 1 so that the latter can be slanted while being guided by the guiding stands 55.

Figure 9:
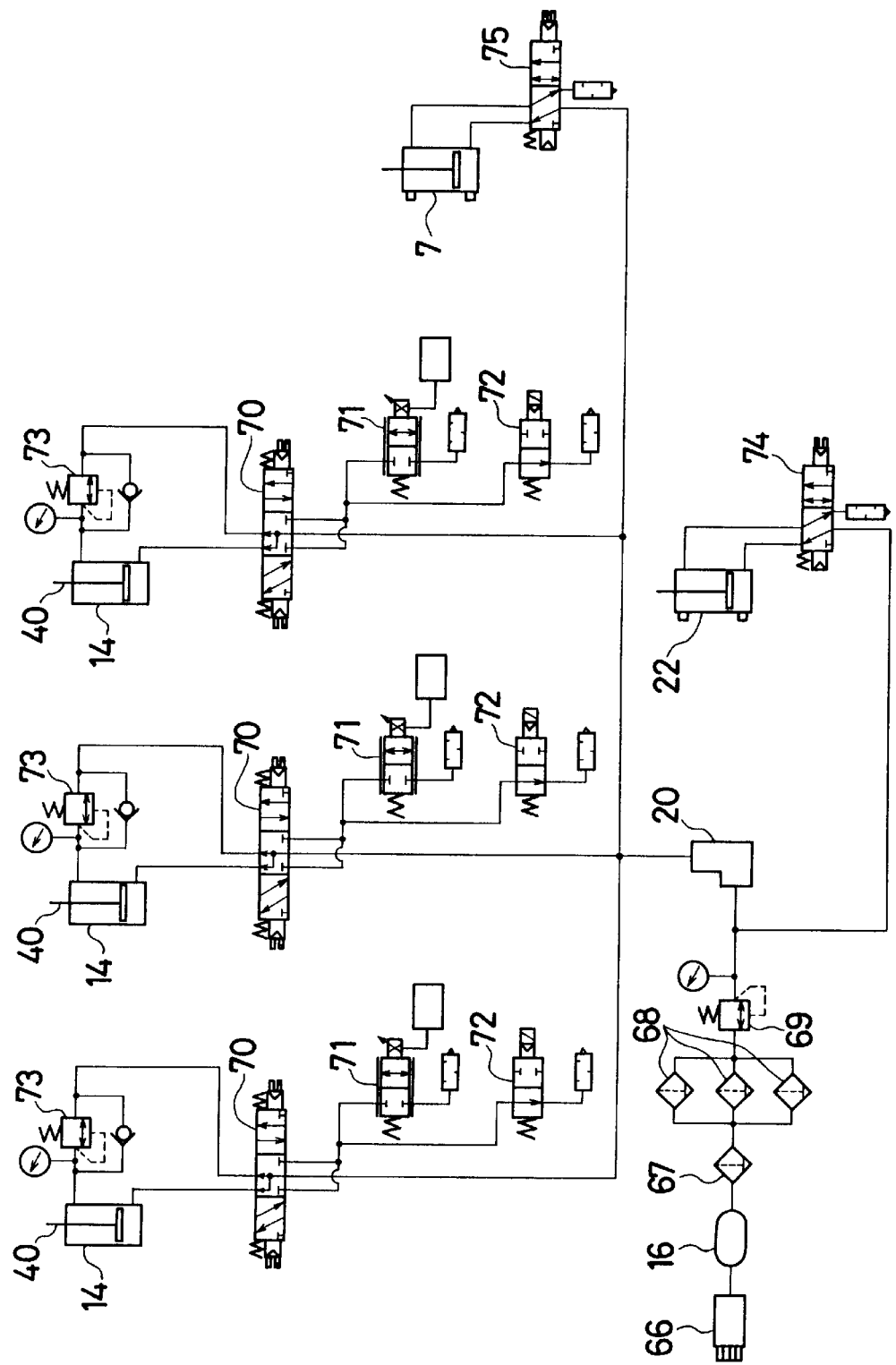
FIG. 9 is a diagram showing a configuration of a pneumatic pressure control circuit.

Referring to FIG. 9, a pneumatic pressure control circuit for supplying compressed air to the individual elevating cylinders 14 includes an air source 66 having the air compressor, the reinforcing members 16 constituting the air tank, air filters 67 and 68, a regulator 69 and the swivel joint 20 of the air supply unit 21. Pressurized air supplied to the turn table 13 by way of the air supply unit 21 is supplied into the individual elevating cylinders 14 via three-way directional control valves 70.

Each three-way directional control valve 70 is associated with a pair of valves 71 and 72. Upward and downward speeds of the piston rod 40 of each elevating cylinder 14 are controlled as the valves 71 and 72 individually open and close in accordance with control signals sent from the unillustrated controller. There is provided a reverse regulator 73 at an upper air supply port of each elevating cylinder 14 in order to equalize upward and downward speeds of the playing box 1.

Part of the air supplied through the regulator 69 is supplied to the brake cylinder 22 via a directional control valve 74 while part of the air supplied to the turn table 13 through the swivel joint 20 is supplied to the cylinder 7 via a directional control valve 75 for opening and closing the gull-wing doors 8 of the playing box 1.

As a player seated in the playing box 1 of the simulation game machine operates the steering wheel 5 or other controls, the torque motor 12 causes the turn table 13 to rotate together with the elevating cylinders 14, slidable supporting frame 15, guiding stands 55 and playing box 1 that are all mounted on the turn table 13. In this way, the player has a realistic feeling consistent with the image shown on the simulation game screen 4.

Specifically, sensor signals indicating operating status of the steering wheel 5, accelerator and brake pedals 6, etc. are entered via the upper transmission wires 32, rotary connector 34 and lower transmission wires 33 to the unillustrated controller. The controller outputs control signals corresponding to the sensor signals to the torque motor 12. Consequently, the turn table 13 and the playing box 1 are rotated together in a direction and at a speed in accordance with the operating direction and speed of the steering wheel 5 and other controls.

Figure 10:
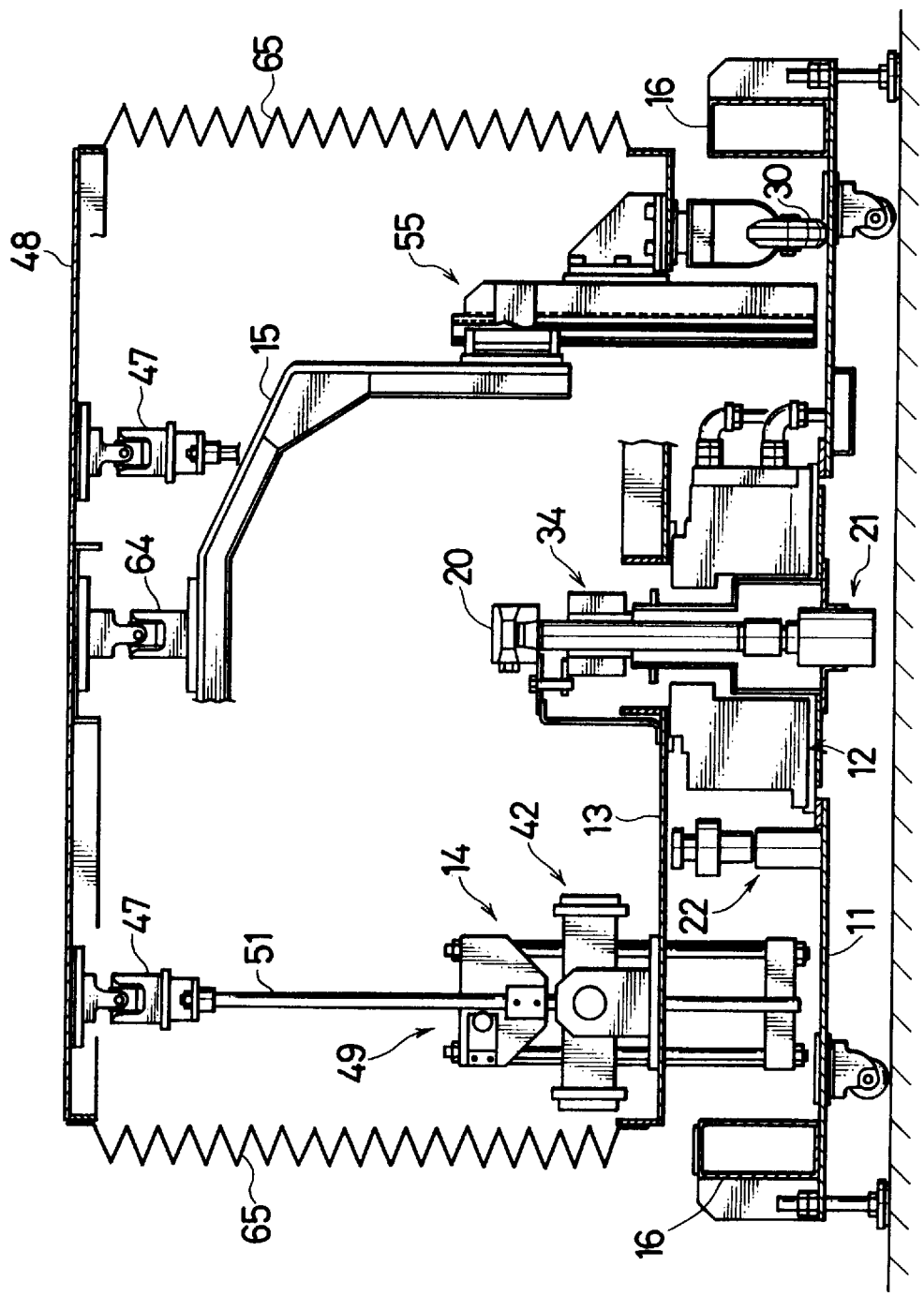
FIG. 10 is a sectional view similar to FIG. 4, showing a state in which the playing box is raised in a horizontal posture.
Figure 11:
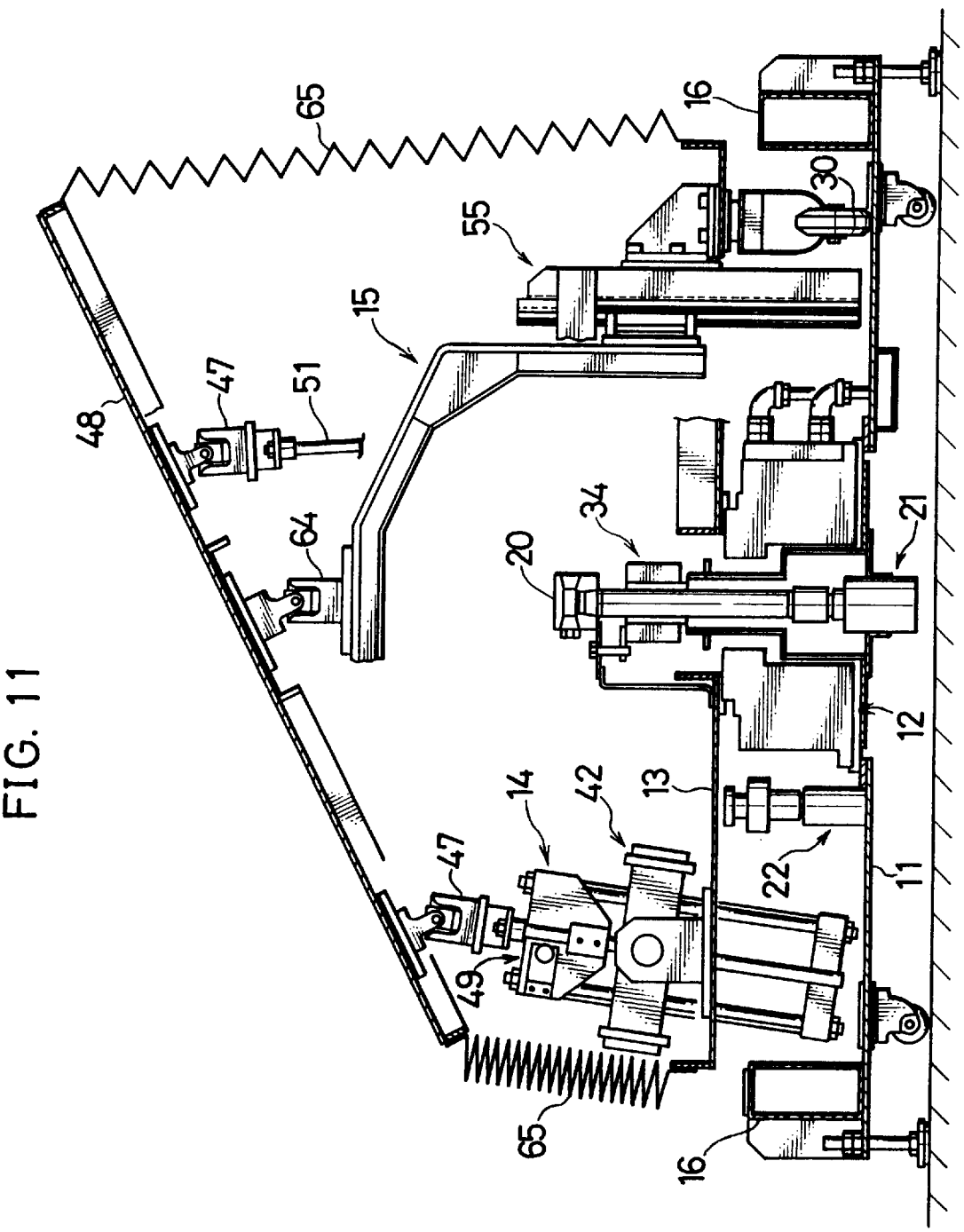
FIG. 11 is a sectional view similar to FIG. 4, showing a state in which the playing box is raised in a slanted posture.

When air charged from the air source 66 into the air tank of the reinforcing members 16 is delivered to the individual elevating cylinders 14 via the air supply unit 21 and other fittings, the bottom plate 48 of the playing box 1 is driven up and down. If the piston rods 40 of all the elevating cylinders 14 evenly moved out, for example, the bottom plate 48 of the playing box 1 rises in a horizontal posture as shown in FIG. 10. If the piston rods 40 of the elevating cylinders 14 unevenly moved out, the bottom plate 48 of the playing box 1 is inclined as shown in FIG. 11.

When the playing box 1 is inclined, horizontal distances between the upper ends of the individual piston rods 40 become smaller. The upper ends of the piston rods 40 are pulled inward. Therefore, this causes the individual elevating cylinders 14 to sway inward about the first and second pairs of pivots 43 and 45. As a result, the playing box 1 of the simulation game machine can be maintained aslant without causing deformation of the piston rods 40 of the elevating cylinders 14.

When the playing box 1 moves up or down, the slidable supporting frame 15 connected to the center of the bottom plate 48 of the playing box 1 is also carried up or down, guided by the guiding stands 55. Thanks to this construction, it is possible to prevent the individual elevating cylinders 14 from turning over even when the playing box 1 is inclined and its supporting forces are not properly balanced. Thus, the playing box 1 can be raised and lowered in a safe and stable manner.

In this embodiment, there is provided the torque motor 12 for rotating the turn table 13 on which the elevating cylinders 14 are mounted. The turn table 13 and the playing box 1 are rotated together by the torque motor 12 in response to player operations on the steering wheel 5. This will enhance the simulation of game and give the player an increased virtual reality feeling.

In the space 12a at the center of the torque motor 12 are provided the air supply unit 21 for supplying compressed air, the upper and lower transmission wires 32 and 33, and the rotary connector 34 for connecting the upper and lower transmission wires 32 and 33. The rotary connector 34 directly connects the upper transmission wires 32, which are connected with the controlling portion of the playing box 1 mounted on the turn table 13, to the lower transmission wires 33, which are connected to the controller on the base plate 14. This will assure trouble-free signal transmission because of the direct connection. Also, the rotary connector 34 will keep the upper and lower transmission wires 32 and 33 from twisting together with the rotation of the turn table 13.

The inner conductive cylinder member 35 of the rotary connector 34 is fixedly attached on the air pipe 18 of the air supply unit 21 which is disposed in the space 12a of the torque motor 12. The outer conductive cylinder member 36 of the rotary connector 34 is connectedly to the turn table 13. Accordingly, the rotary connector 34 can be easily mounted without providing any special complicated attachment device.

The brake cylinder 22 is mounted on the base plate 11 of the simulation game machine. In case of power failure or system breakdown, the brake cylinder 22 causes the piston rod 23 to moved out so that the brake pad 26 at the upper end of the piston rod 23 is securely pressed against the bottom of the turn table 13. Therefore, even when a failure occurs while the turn table 13 is being rotated by the torque motor 12, rotation of the turn table 13 is automatically stopped so that the player would not be frightened.

The main cylinder body 39 of each elevating cylinder 14 is swingably supported by its support mechanism 42 mounted on the turn table 13 and the piston rod 40 of each elevating cylinder 14 is connected to the bottom plate 48 of the playing box 1 by the universal joint 47. With this arrangement, the playing box 1 can be moved up and down and inclined to desired angles without requiring much space between the playing box 1 and the mounting level of the elevating cylinders 14.

More specifically, each main cylinder body 39 is vertically supported at approximately the midpoint of its length by means of the support mechanism 42. Accordingly, each main cylinder body 39 is mounted with its lower portion positioned below the turn table 13 sticking out downward through the opening 41. This arrangement serves to narrow the gap between the mounting level of the elevating cylinders 14, or the turn table 13 on which the support mechanisms 42 are mounted, and the bottom plate 48 of the playing box 1 which is raised and lowered by the piston rods 40 of the elevating cylinders 14. In addition, the arrangement reduces moments acting on the slidable supporting frame 15 and guiding stands 55 which support the playing box 1 when it is raised or lowered. It will be seen that the rotating apparatus of the invention can support the playing box 1 in a stabler manner compared to the conventional apparatus in which each elevating cylinder is supported with its lower end mounted on a turn table by means of a universal joint.

Furthermore, the main cylinder bodies 39 can be inclined in a desired direction and yet the tilt angle can be set to a large value. This is because each support mechanism 42 includes the first and second pairs of pivots 43, 45 and the individual main cylinder bodies 39 are supported swingably about them. It is therefore possible to produce a great variety of rocking or swinging motions of the playing box 1 and consequently give an enhanced feeling of reality to individual players.

In the foregoing embodiment, there are provided the reinforcing members 16 having the closed space which is used as an air tank along the periphery of the base plate 11 on which the playing box 1 and the turn table 13 are mounted. The reinforcing members 16 effectively increase the stiffness of the base plate 11 and yet serve to reduce the reduce the size of the apparatus by eliminating the need for a dedicated space for installing the air tank.

Each elevating cylinder 14 is individually provided with the rack bar 51 mounted to the piston rod 40 as well as the displacement gauge 49 including the potentiometer 53 attached to the main cylinder body 39 for measuring the amount of projection of the piston rod 40. With this arrangement, when the elevating cylinder 14 is inclined as a result of inclination of the playing box 1, the displacement gauge 49 also becomes aslant together with the elevating cylinder 14. This construction helps prevent angular deviation between the displacement gauge 49 and piston rod 40 so that the displacement gauge 49 can correctly measure the amount of projection of the piston rod 40 at any time, making it possible to properly control the operation of the apparatus in accordance with measured values.

The slidable supporting frame 15 is supported at its outermost positions by the guiding stands 55, each mounted between two adjacent elevating cylinders 14. This arrangement not only makes it possible to effectively support the slidable supporting frame 15, ensuring proper distribution of the load imposed on it when raising or lowering the playing box 1, but prevents the system from becoming too large by allowing effective use of the available space with the individual guiding stands 55 mounted between the adjacent elevating cylinders 14.

Although the invention has so far been described with reference to its preferred embodiment having three elevating cylinders 14, it will be understood that there may be provided more than three elevating cylinders 14 with their strokes properly controlled in accordance with control signals outputted from the controller depending on the tilt angle of the playing box 1.

Alternatively, it may be appreciated that the playing box 1 is pivotally mounted by connecting one side of the playing box 1 with a hinge or pivotal connector and elevating the other side of the playing box 1 with one or two elevating cylinders.

What is claimed is:

1. A rotating apparatus for simulatively rotating a playing box of a simulation game machine, comprising:

a turn table on which the playing box is mounted, the playing box being provided with a controlling portion having a first signal transmission wire;

a driver which rotates the turn table, the driver being provided with a controller having a second signal transmission wire; and a rotary connector provided in a center of the turn table, the rotary connector including:

a first conductive member rotatable with the turn table and electrically connected with the first signal transmission wire, the first conductive member comprising a hollow cylinder having an inside surface;

a second conductive member stationary relative to and electrically connected with the second signal transmission wire, the second conductive member comprising a hollow cylinder having an outside surface, said outside surface of the second conductive member being in contact with the inside surface of the first conductive member; and connecting means providing a non-optical and direct electrical connection between said first and second conductive members.

2. A rotating apparatus as defined in claim 1, further comprising:
  an elevating cylinder mounted on the turn table for elevating the playing box; and
  an actuating fluid supplier which supplies actuating fluid to the elevating cylinder, the actuating fluid supplier having a supply pipe extending through a center of the turn table; wherein:
  the first conductive member is fixedly attached to the turn table; and
  the second conductive member is fixedly attached to a periphery of the supply pipe.

3. A rotating apparatus for simulatively rotating a playing box of a simulation game machine comprising:
  a turntable on which the playing box is mounted, said turn table being rotatable about a rotary axis, said playing box having first control means having a first signal transmission wire, said playing box also having a fluid-operated device which includes a first conduit for supplying fluid to said fluid-operated device;
  a driver for rotating said turntable, said driver having a second control means having a second signal transmission wire, a stationary central conduit on said driver for supplying fluid to said first fluid conduit on said playing box, said central conduit having a longitudinal axis coincident with said rotary axis;
  a stationary cylindrical conductive member fixed to the outside of said central pipe, said second wire being disposed externally of said central pipe and being connected to said stationary conductive member;
  a rotary cylindrical conductive member rotatable with said turntable, said rotary conductive member being disposed outside of said stationary conductive member such that an inside surface of said rotary conductive member contacts an outside surface of said rotary stationary conductive member, said first wire being disposed externally of said central pipe and being connected to said rotary conductive member.

4. A rotating apparatus according to claim 3 wherein said stationary conductive member has an outer diameter substantially equal to an inner diameter of said rotary conductive member.

5. A rotating apparatus according to claim 3 comprising a motor for rotating said turntable, said motor having a stator disposed about a rotor, said rotor being rotatable about said rotary axis, said rotor having a central passage, said central pipe extending through said central passage.

6. A rotating apparatus according to claim 5 wherein an annular passage is formed between the outside of said central pipe and said central passage of said rotor, said second wire extending into said annular passage.

7. A rotating apparatus according to claim 5 further comprising bracket means connecting said rotary conductive member to said rotor.

8. A rotating apparatus according to claim 5 further comprising a swivel joint between said first conduit and said central conduit, and bracket means connecting part of said swivel joint to said rotor.

* * * * *